(No Model.)
G. H. ZSCHECH.
SAW GUIDE.
No. 249,721. Patented Nov. 15, 1881.
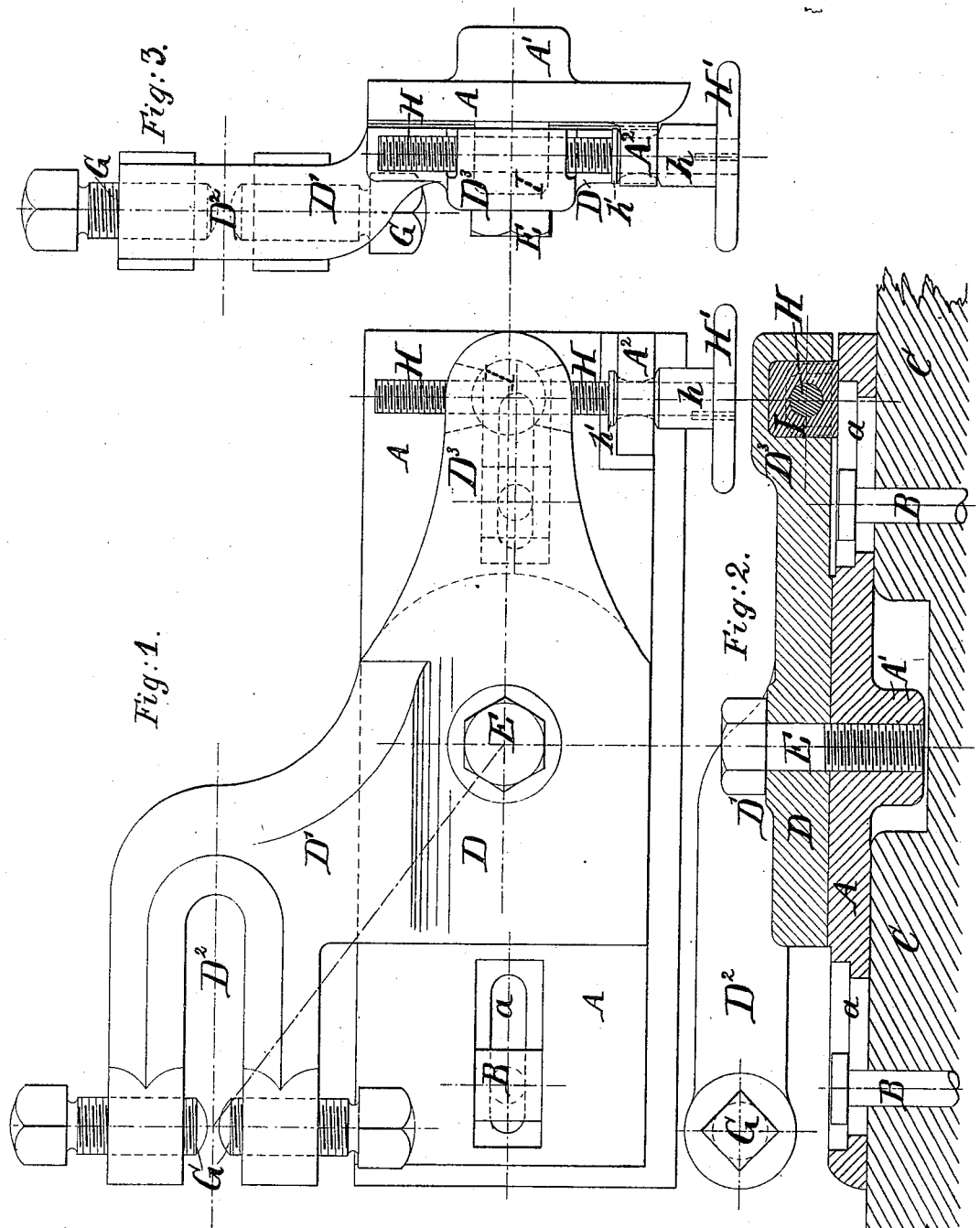
Witnesses.
H. A. Johnstone.
Charles C. Stetson.
Inventor:
Gustavus H. Zschech
by his attorney
Thomas D. Stetson

UNITED STATES PATENT OFFICE.

GUSTAVUS H. ZSCHECH, OF INDIANAPOLIS, INDIANA, ASSIGNOR TO HIMSELF AND LINDLEY VINTON, OF SAME PLACE.

SAW-GUIDE.

SPECIFICATION forming part of Letters Patent No. 249,721, dated November 15, 1881.

Application filed September 17, 1881. (No model.)

*To all whom it may concern:*

Be it known that I, GUSTAVUS H. ZSCHECH, of Indianapolis, in the county of Marion and State of Indiana, have invented certain new and useful Improvements in Saw-Guides, of which the following is a specification.

The improvement is of that class adapted for use in connection with saws, especially circular saws, to prevent their wabbling and to hold their cutting-surfaces to a practically uniform line near the point where they enter the wood. Devices for this general purpose have been long known and approved.

I provide a short rigid lever turning on a substantially fixed center and moved by a screw engaging in a swiveling nut. The saw is guided by two screws with spheroidal ends set in a fork. The center of motion is so far out of the plane of the saw that a turning of the lever to adjust the saw right and left also shifts the bearing-points of the screws outward or inward on the saw and distributes the slight wear of the points over a large surface of the saw.

The device is adapted to be set adjustably but very firmly on the framing.

The accompanying drawings form a part of this specification.

Figure 1 is a plan view. Fig. 2 is a vertical section, and Fig. 3 a front elevation.

Similar letters of reference indicate like parts in all the figures.

A is a foundation-plate, of malleable cast-iron or other suitable material, formed with a boss, A', and with slots $a$, rabbeted, as shown, to receive the heads of fastening-screws B, which confine it adjustably but firmly upon a bench, C. The recess for the boss A' is elongated in the proper direction to allow the entire casting to be shifted toward the saw as the saw is reduced in diameter by use.

D is a rigid lever, of malleable cast-iron or other suitable material, strongly centered by the pivot-screw E. Portions of this lever will be indicated by additional marks, as D', $D^2$, &c. The lateral arm D' carries a fork, $D^2$, set at an angle therewith. Through the arms of this fork are tapped screws G, with spheroidal ends, which are set to the proper distance apart to touch on opposite faces of the saw.

The foundation-plate A and lever D have a broad and well-finished bearing. The position of the lever is controlled by the screw H, turning in a fixed bearing, $A^2$, formed on the plate, and engaging in a peculiarly-formed nut, I, set in a smoothly-bored recess on the under side of the lever $D^3$. The nut swivels or turns in its bearing as the screw is operated and the lever D turned. The screw H is turned by a small hand-wheel, H', having a collar, $h$, which, conjointly with the collar $h'$, serves to confine the screw in its bearings. The faces of the collars $h$ $h'$ adjoining the bearing and the bearing itself are spheroidal, as shown, in order to allow the screw to stand at various angles, as necessitated by the position of the lever D. A notch or recess, tapered, as shown, in both directions, extends across the under side of the arm $D^3$, to allow for the screw H in all the positions which the arm may assume.

The strong pivoting-screw E is turned down firmly so soon as the lever D has been set in the desired position. This avoids all looseness or tremor and holds the parts which come in contact with the saw, and guides it with absolute firmness. The screw E thus performs two functions—that of a pivot for the lever in the act of adjustment and as a means for holding it rigidly when adjusted.

Modifications may be made. The parts may be drop-forgings instead of castings. The bearing-screws G may be hard wood. The swiveling nut I may be the same material.

I claim as my invention—

The lever D, having the lateral arm D', fork $D^2$, and adjusting-arm $D^3$, in combination with the swiveling nut I, mounted in the latter arm, as shown, adjusting-screws G G H, and the pivoting and clamping screw E, mounted on the broad bearing-plate A, and adapted to operate as herein specified.

In testimony whereof I have hereunto set my hand, at Boston, Massachusetts, this 15th day of September, 1881, in the presence of two subscribing witnesses.

GUSTAVUS H. ZSCHECH.

Witnesses:
ALFRED T. SINKER,
JOSEPH EMANUELS.